US012779632B2

(12) United States Patent
Liu

(10) Patent No.: US 12,779,632 B2
(45) Date of Patent: Nov. 3, 2026

(54) SCREWDRIVER ROTATING STRUCTURE

(71) Applicant: NINGBO KING MOUNT CO., LTD., Ningbo City (CN)

(72) Inventor: Kuan-Ting Liu, Taichung City (TW)

(73) Assignee: NINGBO KING MOUNT CO., LTD., Ningbo City (CN)

( * ) Notice: Subject to any disclaimer, the term of this patent is extended or adjusted under 35 U.S.C. 154(b) by 255 days.

(21) Appl. No.: 18/915,189

(22) Filed: Oct. 14, 2024

(65) Prior Publication Data

US 2026/0102884 A1 Apr. 16, 2026

(51) Int. Cl.
*B25B 15/04* (2006.01)

(52) U.S. Cl.
CPC .................................... *B25B 15/04* (2013.01)

(58) Field of Classification Search
CPC ... B25B 15/001; B25B 15/002; B25B 15/004; B25B 15/005; B25B 15/02; B25B 15/04; B25B 15/06; B25B 23/0035; B25B 23/0042; B25B 23/14; B25B 23/142; B25B 23/16; B25B 13/46; B25B 13/462; B25B 13/465; B25B 13/48; F16M 2200/024; F16D 41/00; F16D 41/105; H01R 13/506
See application file for complete search history.

(56) References Cited

U.S. PATENT DOCUMENTS 7,237,459 B1 * 7/2007 Shiao ...................... B25B 15/04 81/62
7,677,137 B1 3/2010 Chen
2010/0116097 A1 * 5/2010 Xu ........................ B25B 13/463 81/62
2015/0107422 A1 * 4/2015 Li ........................... B25B 15/04 81/59.1

* cited by examiner

*Primary Examiner* — Robert J Scruggs
(74) *Attorney, Agent, or Firm* — Justin Lampel

(57) ABSTRACT

A screwdriver rotating structure includes a main body, a driving member, two locking modules, a first elastic element, a control member, a fixed plate, two snap-fit members, a positioning element, and a second elastic element. The main body is provided with two first receiving grooves, a second receiving groove, a third receiving groove, two fourth receiving grooves, a recess, and a restriction portion. The driving member is provided with a ratchet portion and an annular groove. The fixed plate is provided with a pivot hole. The two snap-fit members are assembled with the main body and the driving member. Each of the snap-fit members is provided with a snap-fit block pivotally mounted in the annular groove, so that the driving member is pivotally mounted on the main body. Each of the snap-fit members has a third abutting face.

7 Claims, 13 Drawing Sheets

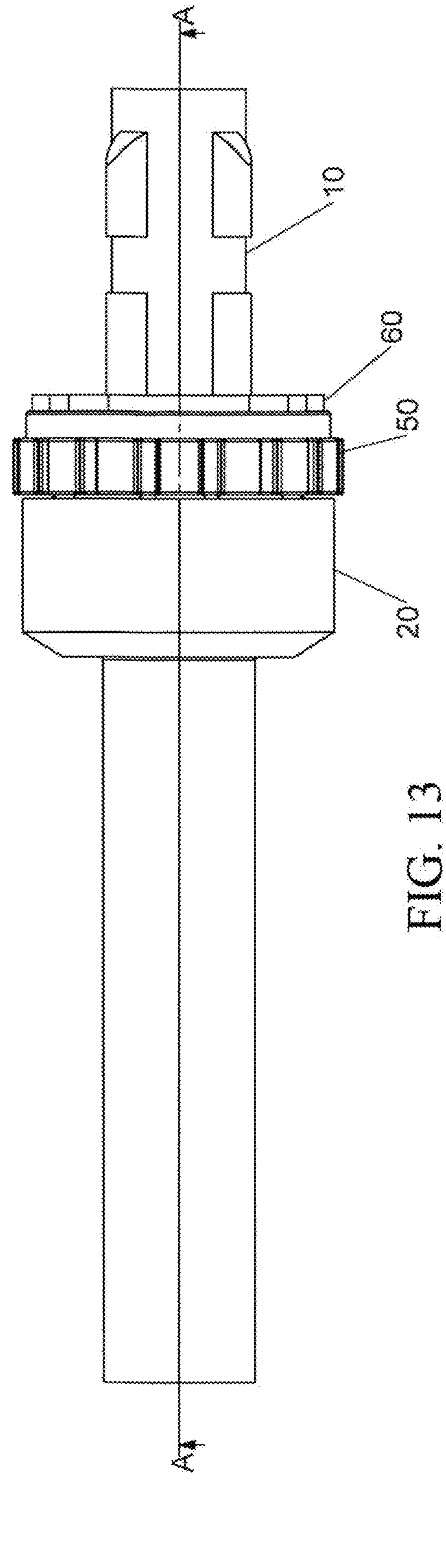
FIG. 13
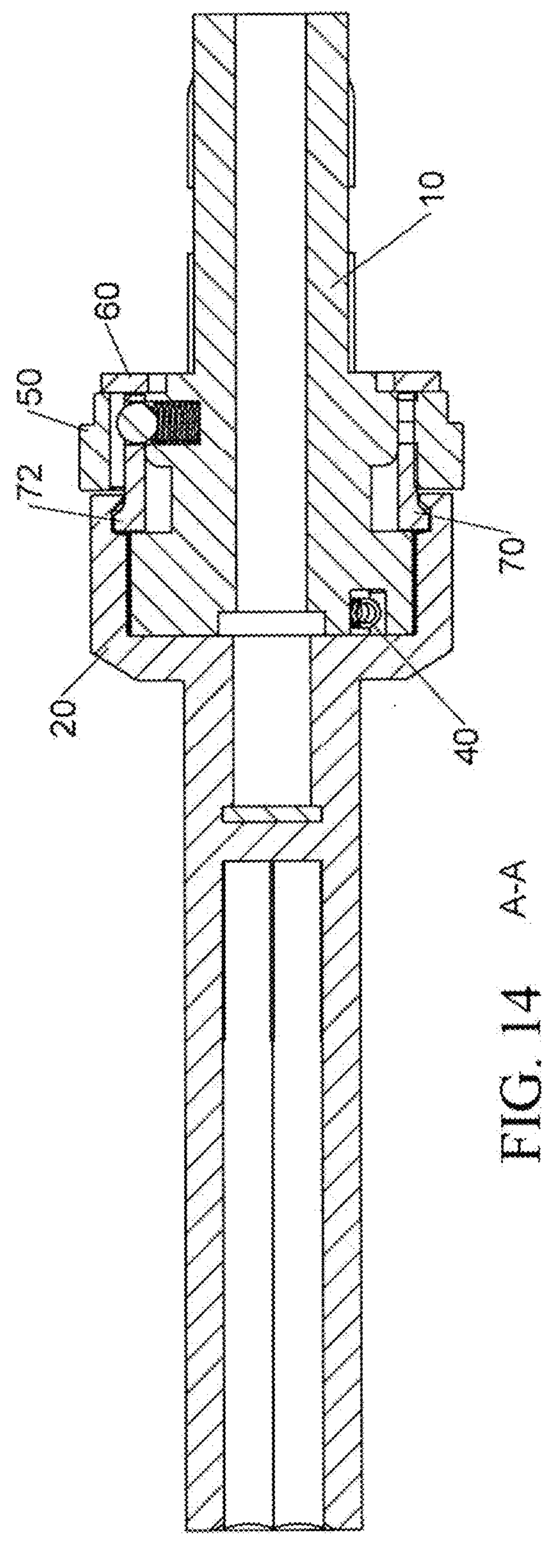
FIG. 14 A-A

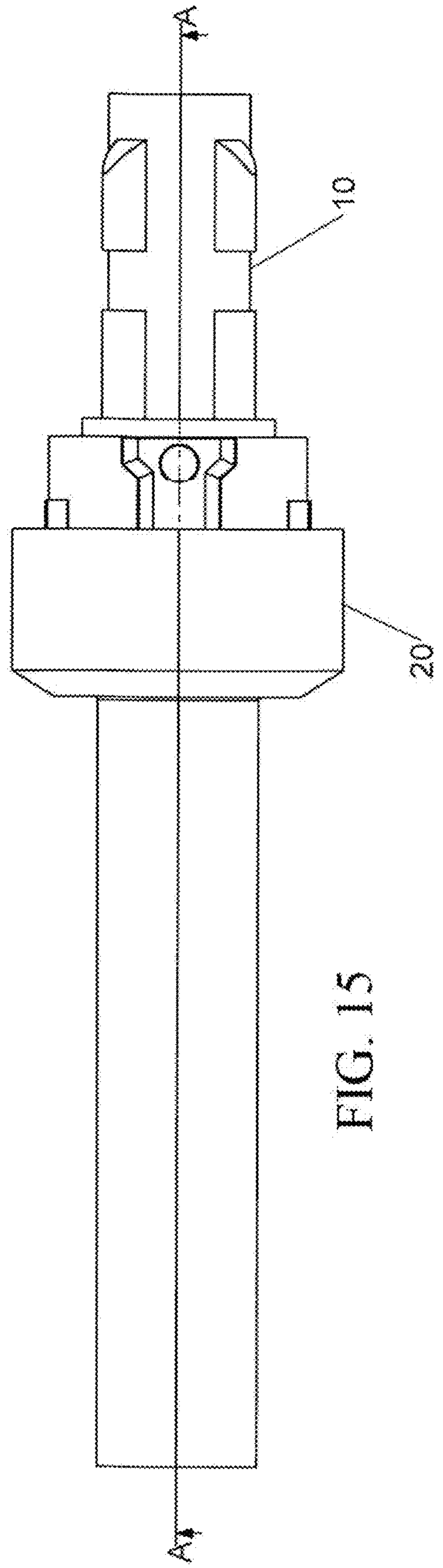
FIG. 15
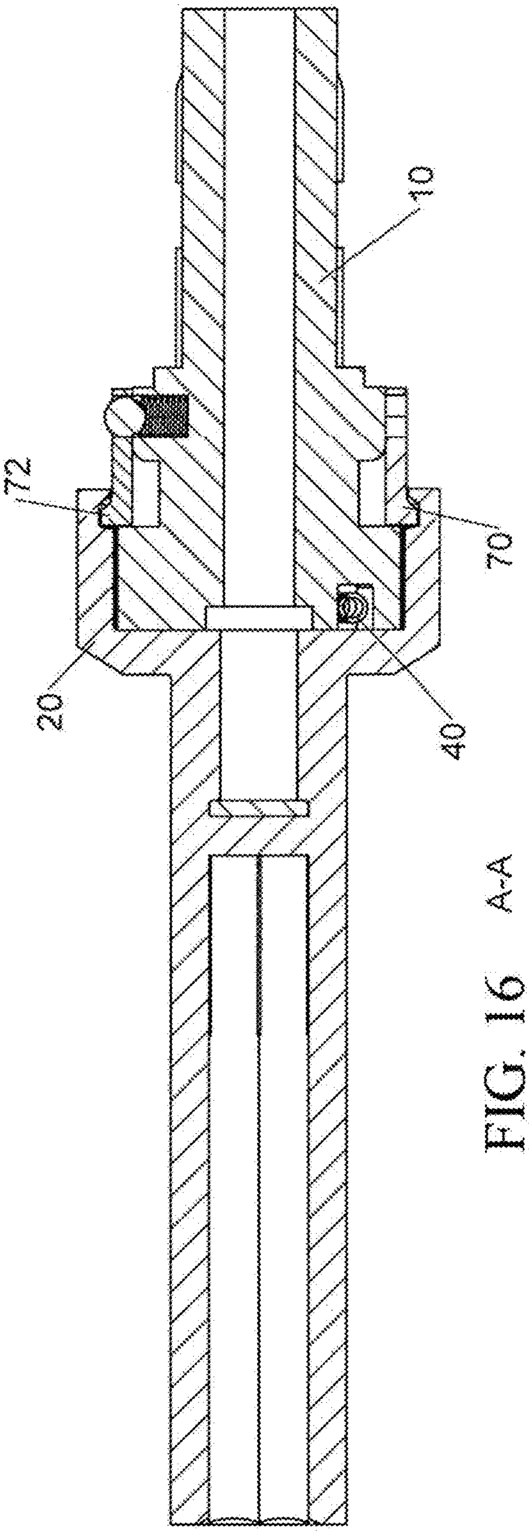
FIG. 16 A-A

SCREWDRIVER ROTATING STRUCTURE

BACKGROUND OF THE INVENTION

Field of the Invention

The present invention relates to a driving or rotating device and, more particularly, to a screwdriver rotating structure.

Description of the Related Art

A conventional reversible ratchet mechanism for ratchet tools was disclosed in the U.S. Pat. No. 7,677,137, and comprises a base 50, two wedge flakes 54*a* and 54*b*, a torsion spring 55, a reversible ring 60, a blind flange 70, and a ratchet 80.

However, the conventional reversible ratchet mechanism has the following disadvantages.

1. The ratchet 80 is mounted on the blind flange 70 by a C ring 82. Then, the blind flange 70 is mounted on the base 50 by a screw 73. The ratchet 80, the blind flange 70, the C ring 82, the base 50, and the screw 73 are assembled. In addition, the ratchet 80 is indirectly connected with the base 50. Thus, a larger tolerance is defined between the ratchet 80 and the base 50.
2. The torsion spring 55 is received in a U groove 533 and limited by the screw 73. The two wedge flakes 54*a* and 54*b* are stretched by the elastic force of the torsion spring 55. The torsion spring 55 has a little contact area with the two wedge flakes 54*a* and 54*b* and easily slides on the two wedge flakes 54*a* and 54*b*, so that the torsion spring 55 cannot push and support the two wedge flakes 54*a* and 54*b* exactly.

BRIEF SUMMARY OF THE INVENTION

The primary objective of the present invention is to provide a screwdriver rotating structure that is assembled and disassembled easily and conveniently.

In accordance with the present invention, there is provided a screwdriver rotating structure comprising a main body, a driving member, two locking modules, a first elastic element, a control member, a fixed plate, two snap-fit members, a positioning element, and a second elastic element. The main body is provided with two first receiving grooves, a first pivot portion, a second receiving groove, a third receiving groove, two fourth receiving grooves, a recess, two first side faces, a second side face, a first spring cavity, and a restriction portion. The driving member is provided with a ratchet portion and an annular groove. The fixed plate is provided with a pivot hole. The two snap-fit members are assembled with the main body and the driving member. Each of the two snap-fit members is received in one of the two fourth receiving grooves. Each of the two snap-fit members is provided with a snap-fit block pivotally mounted in the annular groove, so that the driving member is pivotally mounted on the main body by the two snap-fit members. Each of the two snap-fit members has a bottom provided with a third abutting face. The positioning element is received in the first spring cavity and the second spring cavity. The second elastic element is received in the first spring cavity.

According to the primary advantages of the present invention, the driving member is pivotally mounted on the main body and is snapped on the two snap-fit members. The fixed plate is pivotally mounted on the main body and is sandwiched between the first abutting faces of the limit blocks and the second abutting face. The control member is mounted on the main body and is sandwiched between the driving member and the fixed plate. Each of the two snap-fit members is limited between one of the two fourth receiving grooves, the annular groove, the control member, and the fixed plate. Thus, the main body, the driving member, the control member, the fixed plate, and the two snap-fit members are interconnected, so that the screwdriver rotating structure is assembled steadily and solidly.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 13 is a side view of the screwdriver rotating structure as shown in FIG. 12.

FIG. 14 is a cross-sectional view of the screwdriver rotating structure taken along line A-A as shown in FIG. 13.

FIG. 15 is a partially side view of the screwdriver rotating structure as shown in FIG. 12.

FIG. 16 is a cross-sectional view of the screwdriver rotating structure taken along line A-A as shown in FIG. 15.

DETAILED DESCRIPTION OF THE INVENTION

Figure 1:
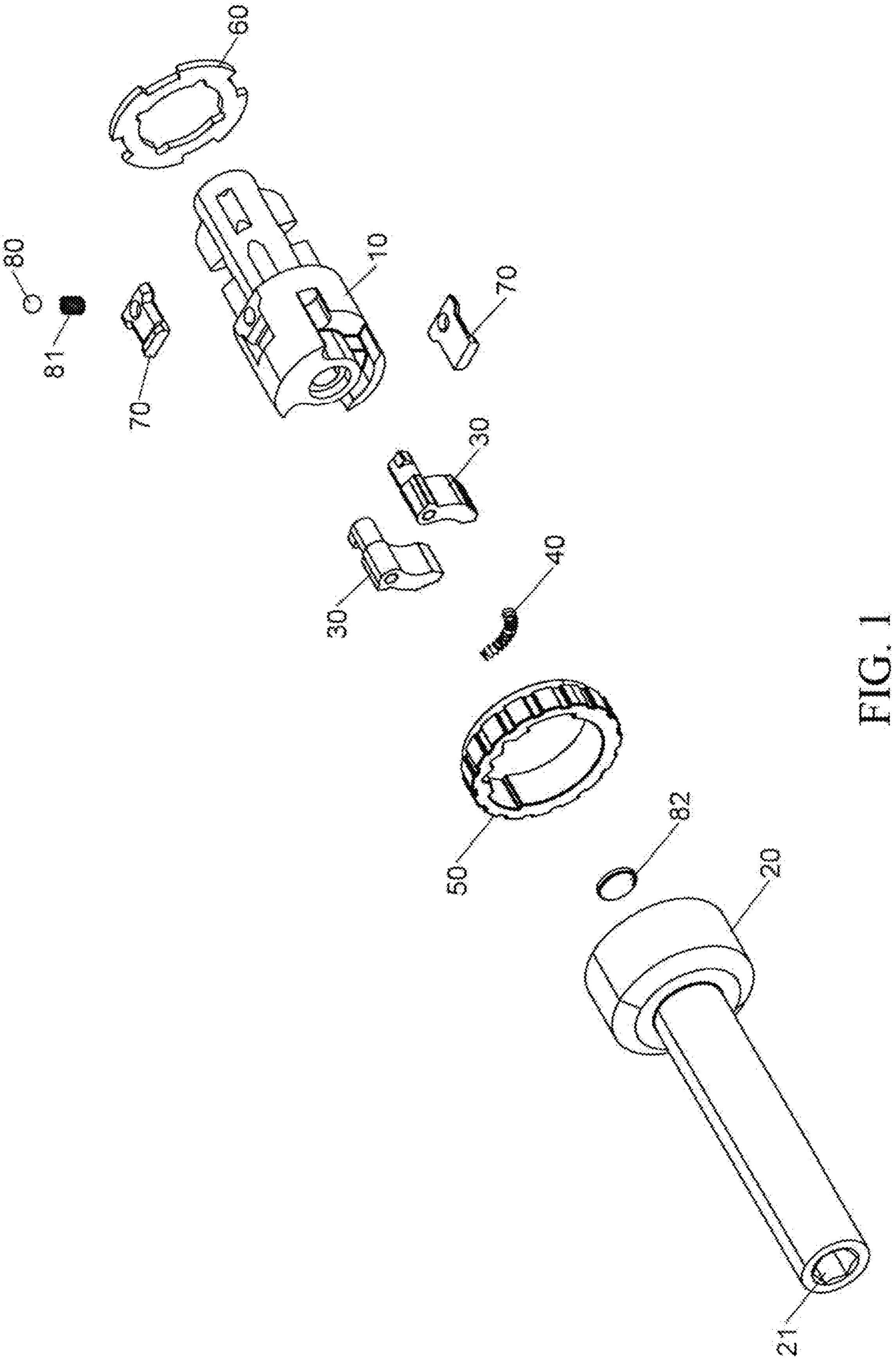
FIG. 1 is an exploded perspective view of a screwdriver rotating structure in accordance with the preferred embodiment of the present invention.
Figure 2:
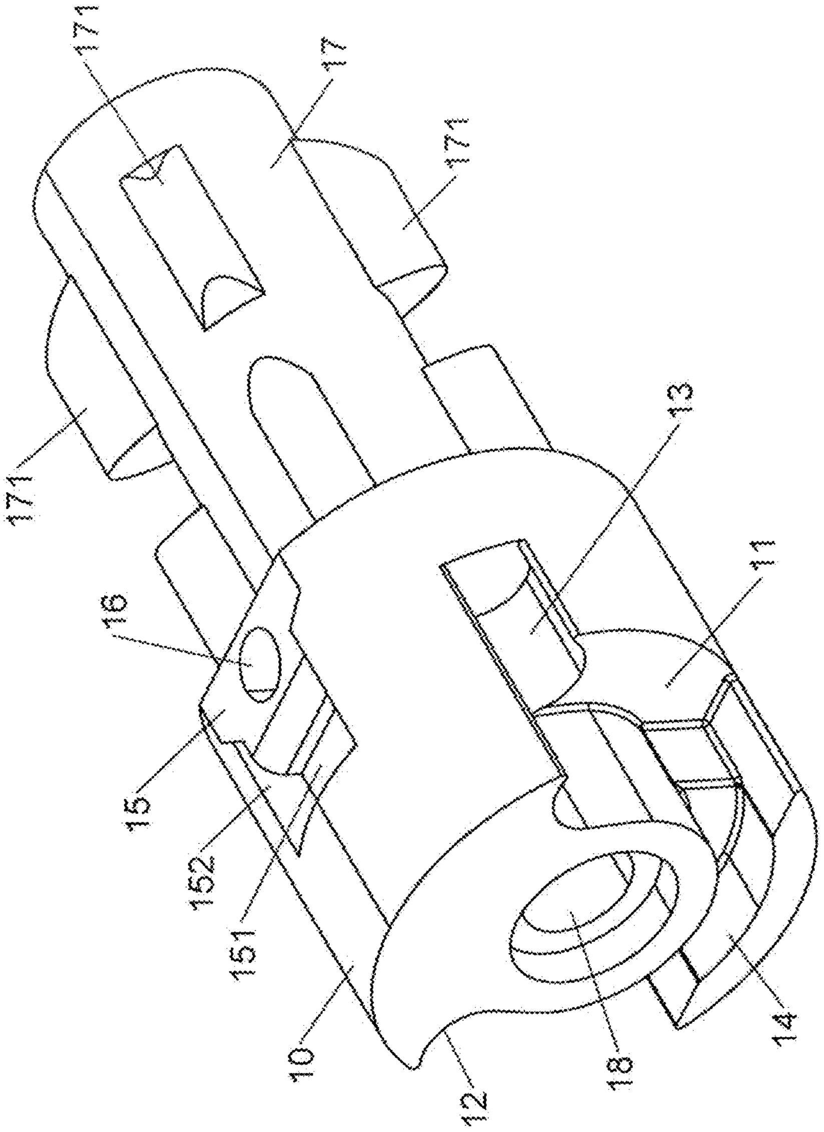
FIG. 2 is a perspective view of a main body of the screwdriver rotating structure in accordance with the preferred embodiment of the present invention.
Figure 3:
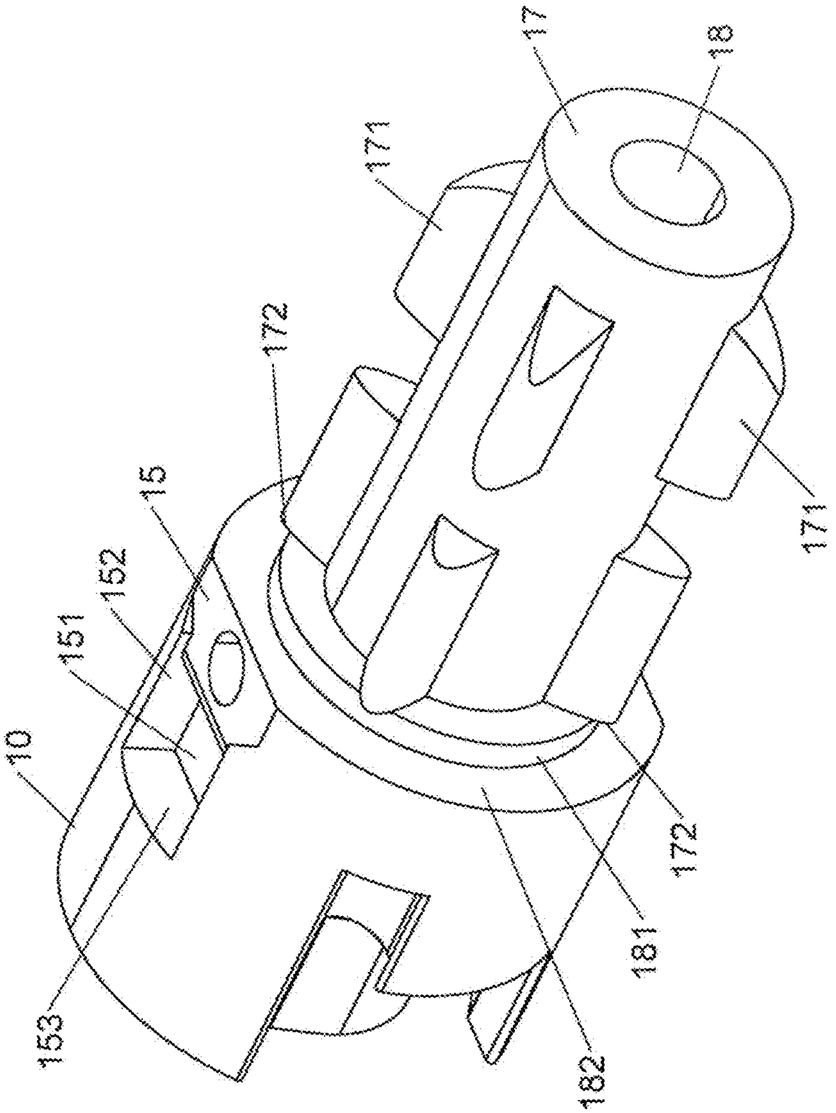
FIG. 3 is another perspective view of the main body.
Figure 4:
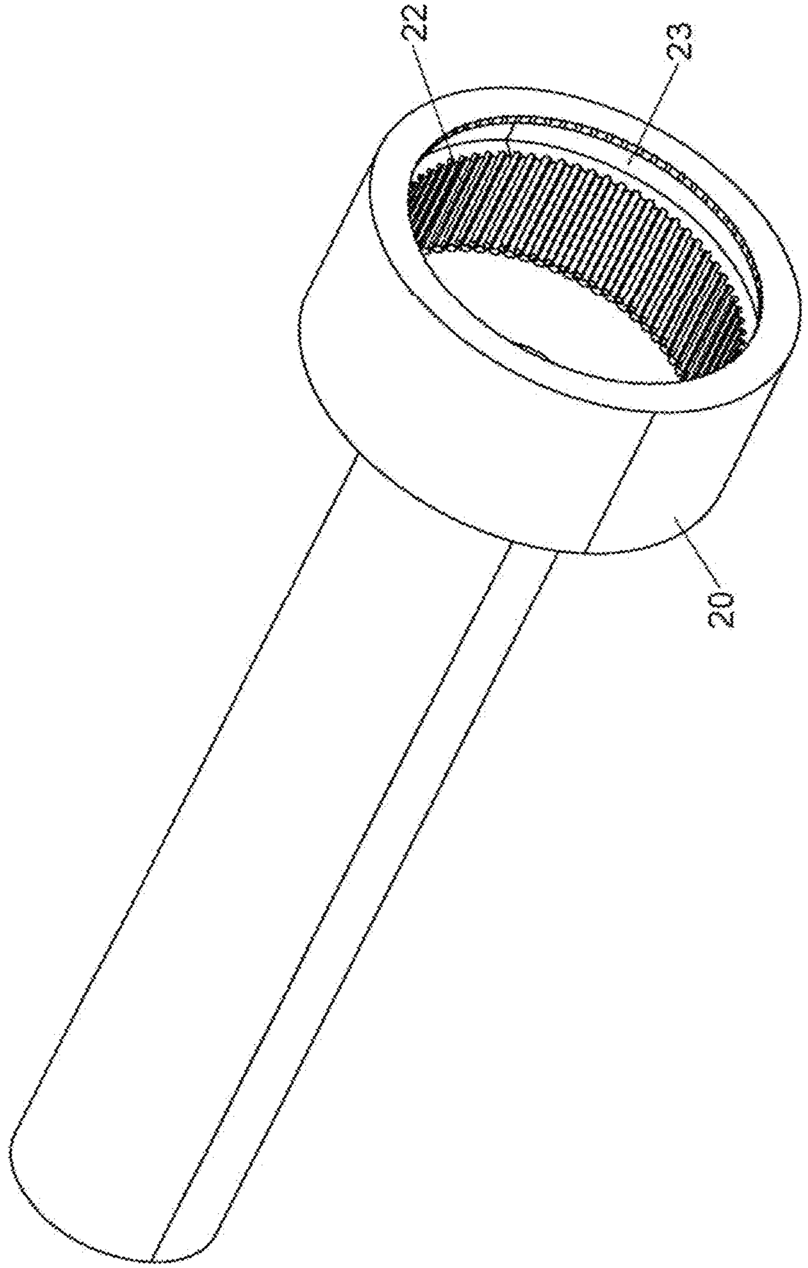
FIG. 4 is a perspective view of a driving member of the screwdriver rotating structure in accordance with the preferred embodiment of the present invention.
Figure 5:
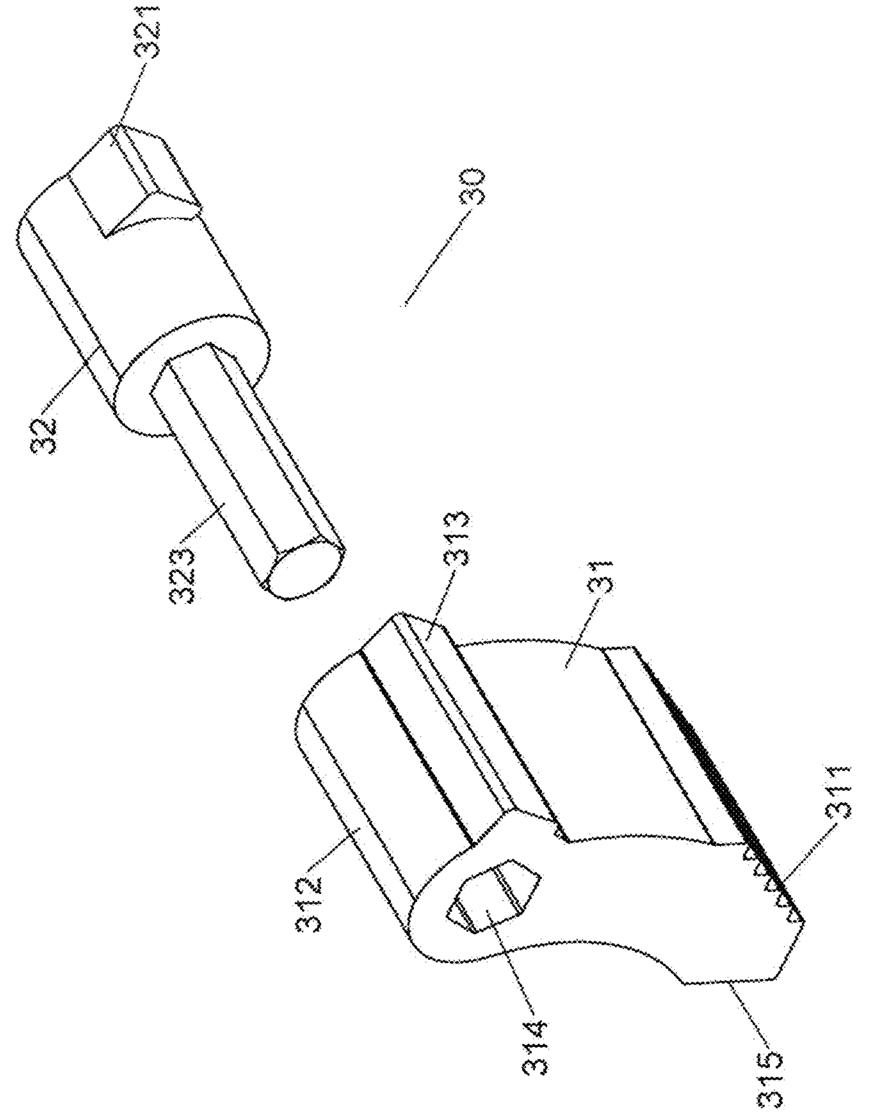
FIG. 5 is an exploded perspective view of a locking module of the screwdriver rotating structure in accordance with the preferred embodiment of the present invention.
Figure 7:
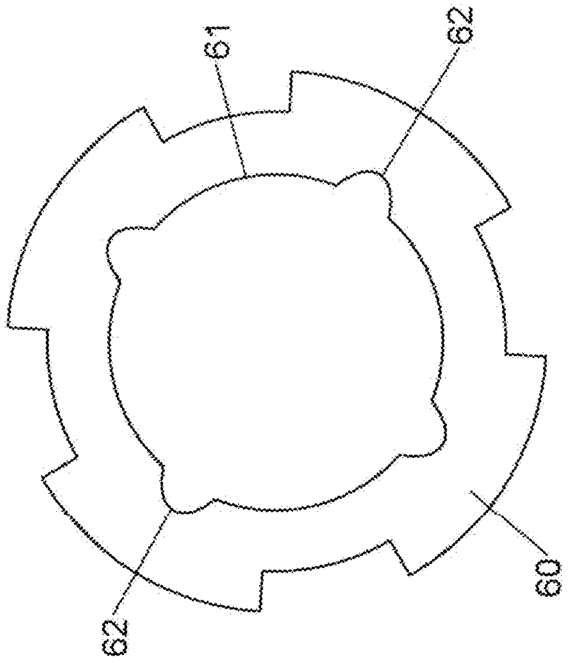
FIG. 7 is a front view of a fixed plate of the screwdriver rotating structure in accordance with the preferred embodiment of the present invention.
Figure 6:
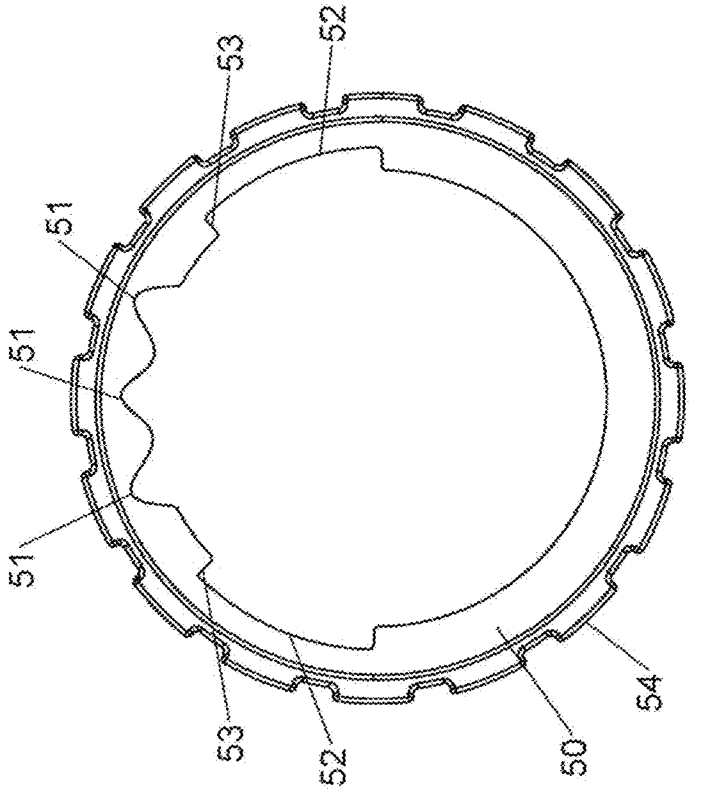
FIG. 6 is a front view of a control member of the screwdriver rotating structure in accordance with the preferred embodiment of the present invention.
Figure 8:
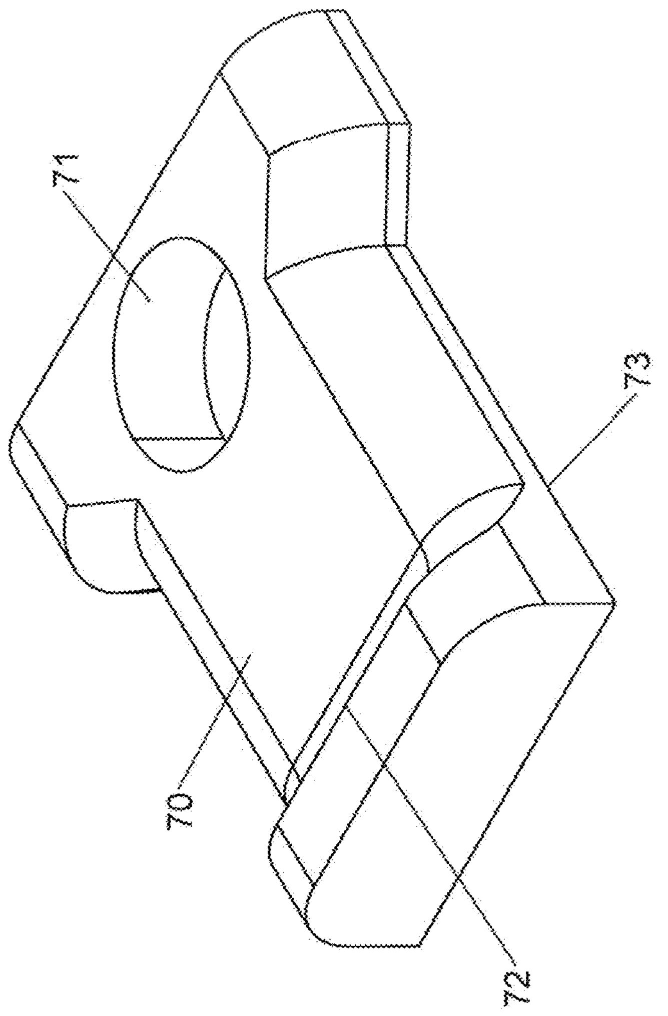
FIG. 8 is a perspective view of a snap-fit member of the screwdriver rotating structure in accordance with the preferred embodiment of the present invention.

Referring to the drawings and initially to FIGS. 1-12, a screwdriver rotating structure in accordance with the preferred embodiment of the present invention comprises a main body (or fixed seat or base) 10, a driving member 20, two locking modules 30, a first elastic element 40, a control (or manipulating or operation) member 50, a fixed plate 60, two snap-fit (or fastening or locking) members 70, a positioning element 80, a second elastic element 81, and a magnetic member 82.

The main body 10 has a first end provided with two first receiving grooves 11 arranged symmetrically. Each of the two first receiving grooves 11 is provided with a first pivot portion 12 and a second receiving groove 13. Each of the two first receiving grooves 11, the first pivot portion 12, and the second receiving groove 13 form an L-shaped slot. The first pivot portion 12 and the second receiving groove 13 are co-axial. The main body 10 is provided with a third receiving groove 14 disposed between the two first receiving grooves 11. The third receiving groove 14 connects the two first receiving grooves 11 transversely. The third receiving groove 14 has an arcuate curved shape. The main body 10 has a peripheral face provided with two fourth receiving grooves 15 arranged symmetrically. The two fourth receiving grooves 15 are arranged annularly relative to an axis of the main body 10. Each of the two fourth receiving grooves 15 is provided with a recess (or depression) 151 connected to each of the two fourth receiving grooves 15. Each of the two fourth receiving grooves 15 is provided with two first side faces 152 and a second side face 153. Each of the two first side faces 152 is perpendicular to the second side face 153. The main body 10 is provided with a first spring cavity 16 formed in one of the two fourth receiving grooves 15. The first spring cavity 16 has a circular shape and does not penetrate the main body 10. The first spring cavity 16 has an axis perpendicular to that of the main body 10. The first spring cavity 16 is not connected to the recess 151.

The main body 10 has a second end provided with a restriction portion 17 having a cylindrical shape. The restriction portion 17 is provided with multiple limit blocks 171. The limit blocks 171 are arranged annularly and linearly on the restriction portion 17. Each of the limit blocks 171 adjacent to the two fourth receiving grooves 15 is provided with a first abutting face 172 directed toward the two fourth receiving grooves 15. The main body 10 is provided with a receiving (or mounting) hole 18 disposed on the axis of the main body 10. The receiving hole 18 penetrates the main body 10 axially. A second pivot portion 181 is formed on the main body 10 and disposed between the two fourth receiving grooves 15 and the restriction portion 17. The second pivot portion 181 has a diameter less than that of the main body 10 so that a second abutting face 182 is formed on the main body 10 and disposed between the second pivot portion 181 and the main body 10.

A grip is mounted on the restriction portion 17 and is operated by a user's hand to rotate the main body 10.

The driving member 20 has a first end provided with a mounting portion 21. The mounting portion 21 is a polygonal or noncircular hole. The driving member 20 has a second end having an interior provided with a ratchet portion 22 having multiple teeth arranged annularly. The ratchet portion 22 is pivotally mounted on the main body 10. The ratchet portion 22 has an opening provided with an annular groove 23 aligning with the recess 151. The annular groove 23 has a diameter more than that of the ratchet portion 22.

The two locking modules 30 are respectively mounted in the two first receiving grooves 11, the first pivot portion 12, and the second receiving groove 13. The two locking modules 30 are arranged symmetrically relative to the main body 10. Each of the two locking modules 30 includes a pawl member 31 and a locking block 32.

The pawl member 31 is received in one of the two first receiving grooves 11. The pawl member 31 has a first end provided with an engaging portion 311 meshing with the ratchet portion 22. The engaging portion 311 has multiple engaging teeth. The pawl member 31 has a second end provided with a third pivot portion 312 pivotally connected with the first pivot portion 12, so that the pawl member 31 is rotated about the first pivot portion 12 through an angle. The third pivot portion 312 is provided with a first control portion 313 protruding outward. The third pivot portion 312 has an axis provided with a first connecting portion 314. The first connecting portion 314 is a hexagonal or noncircular hole. The pawl member 31 is provided with an abutting block 315 directed toward the third receiving groove 14.

The locking block 32 is received in the second receiving groove 13. The locking block 32 has a first end provided with a second control portion 321. The second control portion 321 aligns with the first control portion 313 after the locking block 32 is assembled with the pawl member 31. The locking block 32 has a second end provided with a second connecting portion 323 connected with the first connecting portion 314, so that the pawl member 31 and the locking block 32 are rotated synchronously. The second connecting portion 323 has a shape corresponding to that of the first connecting portion 314.

The first elastic element 40 is received in the third receiving groove 14 and has two ends elastically pressing the two locking modules 30, so that the engaging portion 311 constantly meshes with the ratchet portion 22 by an elastic force of the first elastic element 40. The first elastic element 40 is biased between the abutting blocks 315 of the two locking modules 30.

The control member 50 is pivotally mounted on the main body 10 and is rotatable relative to the main body 10. The control member 50 is rotated to control operation of the screwdriver rotating structure so that the screwdriver rotating structure is operated in a one-way direction (only in the clockwise or counterclockwise direction) or in a two-way direction (in the clockwise and counterclockwise directions). The control member 50 rests on a side of the driving member 20 or a gap is defined between the control member 50 and the driving member 20.

The control member 50 is provided with three positioning grooves 51 arranged annularly and spaced from each other. One of the three positioning grooves 51 aligns with the first spring cavity 16. The control member 50 is provided with two receiving spaces 52, with the three positioning grooves 51 being located between the two receiving spaces 52. The second control portion 321 of each of the two locking modules 30 is received in one of the two receiving spaces 52. The two receiving spaces 52 are arranged symmetrically. Each of the two receiving spaces 52 has a side provided with a third control portion 53 located adjacent to the three positioning grooves 51. The control member 50 is rotated to a position where the third control portion 53 of one of the two receiving spaces 52 presses the second control portion 321 of one of the two locking modules 30, so that the engaging portion 311 of one of the two locking modules 30 disengages the ratchet portion 22. The control member 50 has a peripheral face provided with a rotation portion 54 having multiple projections to facilitate rotation of the control member 50.

The fixed plate 60 has a circular shape. The fixed plate 60 is assembled with the main body 10 and is provided with a pivot hole 61 allowing passage of the restriction portion 17. The pivot hole 61 is provided with multiple limit grooves 62 allowing passage of the limit blocks 171. The limit grooves 62 are arranged annularly and spaced from each other. The limit grooves 62 have a number equal to that of the limit blocks 171. The pivot hole 61 is pivotally mounted on the second pivot portion 181 and has a first side abutting the second abutting face 182. When the fixed plate 60 is rotated slightly after the limit grooves 62 pass the limit blocks 171, the limit grooves 62 misalign with the limit blocks 171, and the first abutting faces 172 of the limit blocks 171 rest on a second side of the fixed plate 60, so that the fixed plate 60 is secured on the main body 10 without detachment. Thus, the control member 50 is pivotally mounted on the main body 10 and limited by the fixed plate 60, so that the control member 50 is sandwiched between the fixed plate 60 and the driving member 20 without detachment.

The two snap-fit members 70 are assembled with the main body 10 and the driving member 20. Each of the two snap-fit members 70 is received in one of the two fourth receiving grooves 15. Each of the two snap-fit members 70 is provided with a second spring cavity 71 aligning with the first spring cavity 16. Each of the two snap-fit members 70 is provided with a snap-fit block 72 pivotally mounted in the annular groove 23, so that the driving member 20 is pivotally mounted on the main body 10 by the two snap-fit members 70. Each of the two snap-fit members 70 has a bottom provided with a third abutting face 73 directed toward the recess 151. Each of the two snap-fit members 70 has two sides abutting the two first side faces 152 and has a first end abutting the second side face 153, so that each of the two snap-fit members 70 is limited and non-movable in one of the two fourth receiving grooves 15. Each of the two snap-fit members 70 has a second end limited by the fixed plate 60. The two snap-fit members 70 are limited by the control member 50 so that the two snap-fit members 70 are mounted on the main body 10 without detachment.

In assembly, referring to FIGS. 15 and 16 with reference to FIGS. 1-14, the third abutting face 73 extends into the recess 151 before assembly of the control member 50 and the fixed plate 60, so that the recess 151 allows movement of the snap-fit block 72. In such a manner, when the driving member 20 is mounted on the main body 10, the annular groove 23 slides on the two snap-fit members 70, and the snap-fit block 72 is snapped into the annular groove 23. The limit grooves 62 align with the limit blocks 171. The control member 50 and the fixed plate 60 are mounted on the main body 10 serially. The fixed plate 60 is rotated slightly until the limit grooves 62 misalign with the limit blocks 171, so that the fixed plate 60 is secured on the main body 10. The control member 50 and the two snap-fit members 70 are assembled on the main body 10 by limit of the fixed plate 60. Thus, each of the two snap-fit members 70 is limited by the two first side faces 152, the second side face 153, the control member 50, and the fixed plate 60, so that the third abutting face 73 is detached from the recess 151, to interrupt movement of the snap-fit block 72, and the driving member 20 is pivotally mounted on the main body 10.

The positioning element 80 is received in the first spring cavity 16 and the second spring cavity 71. The positioning element 80 is a round bead or ball.

The second elastic element 81 is received in the first spring cavity 16. The second elastic element 81 is biased between a bottom of the first spring cavity 16 and the positioning element 80, so that the positioning element 80 protrudes from the second spring cavity 71 slightly. Thus, the positioning element 80 is positioned in one of the three positioning grooves 51, so that the control member 50 is positioned on the main body 10 and drives the driving member 20 to idle in the counterclockwise direction, to rotate in the counterclockwise and clockwise directions, and to idle in the clockwise direction.

The magnetic member 82 is mounted on the driving member 20 to magnetically attract screwdriver tips of various types.

Figure 9:
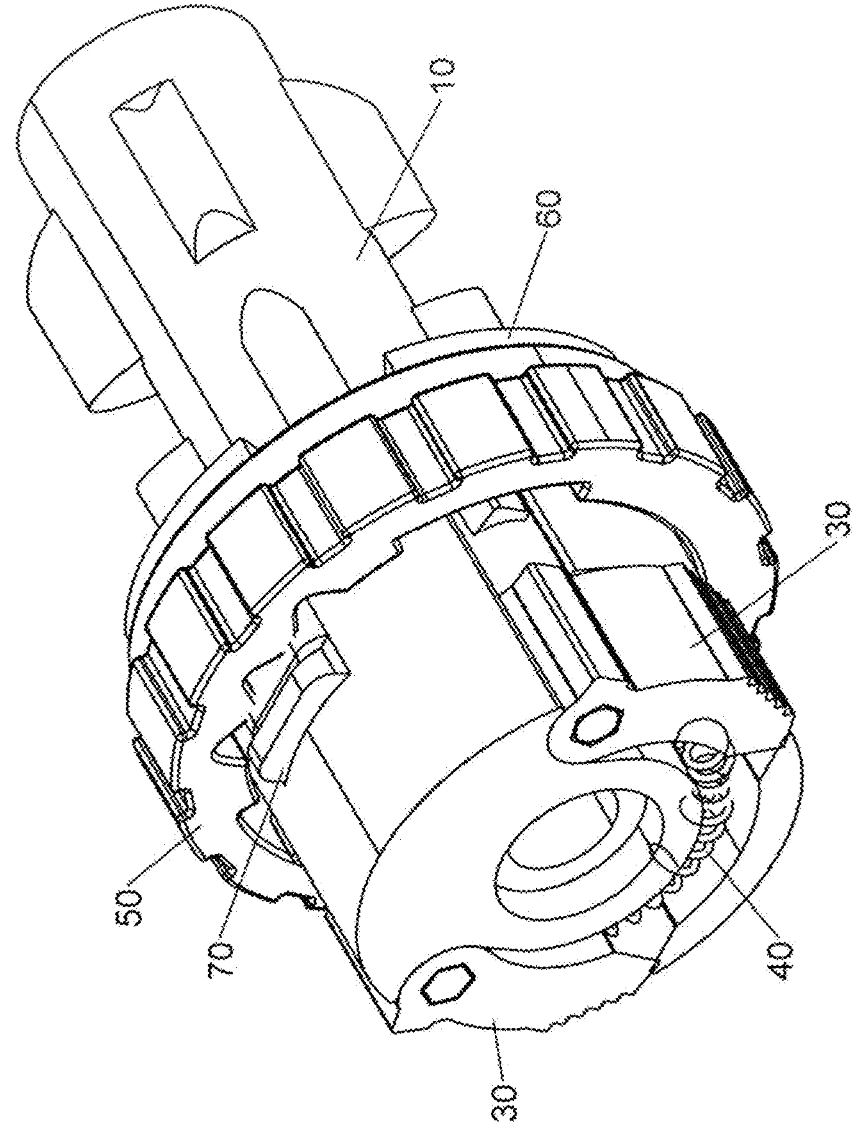
FIG. 9 is a partial perspective view of the screwdriver rotating structure in accordance with the preferred embodiment of the present invention.
Figure 10:
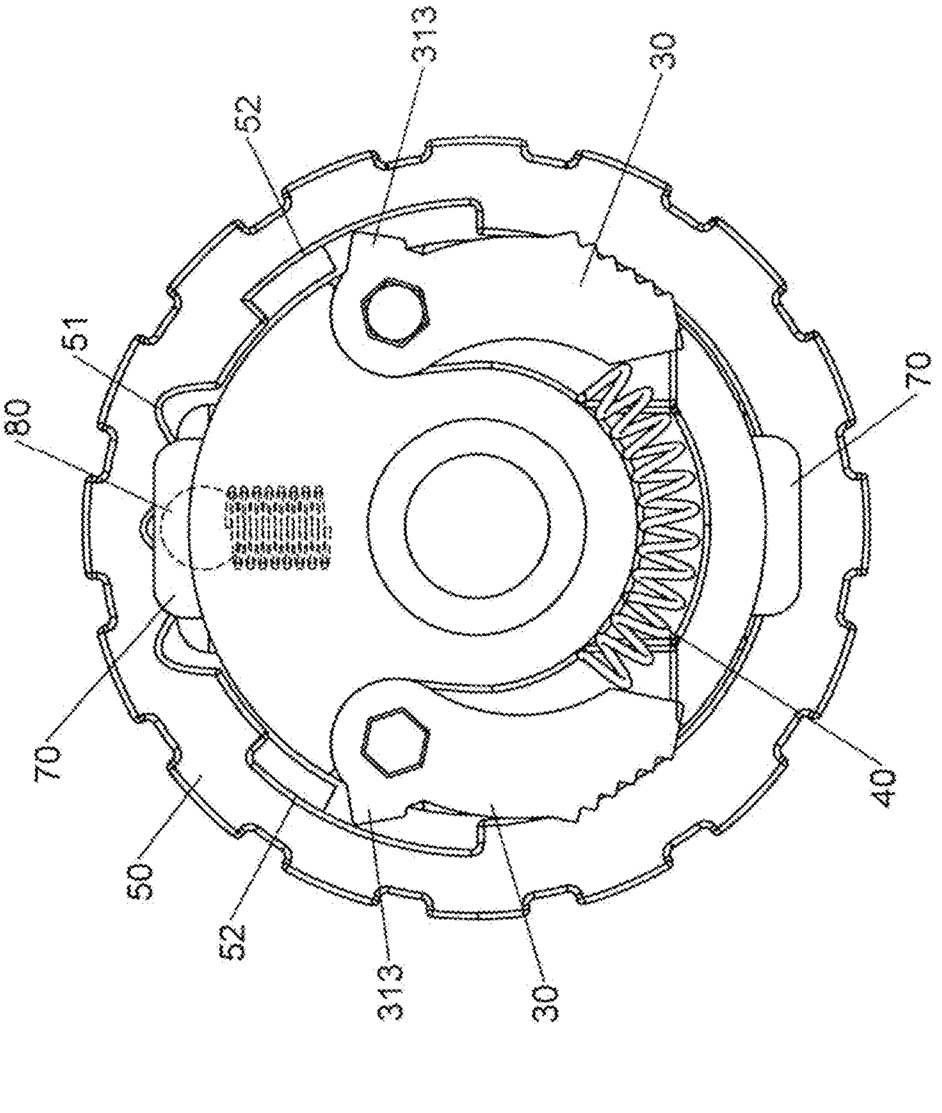
FIG. 10 is a front view of the screwdriver rotating structure as shown in FIG. 9.
Figure 11:
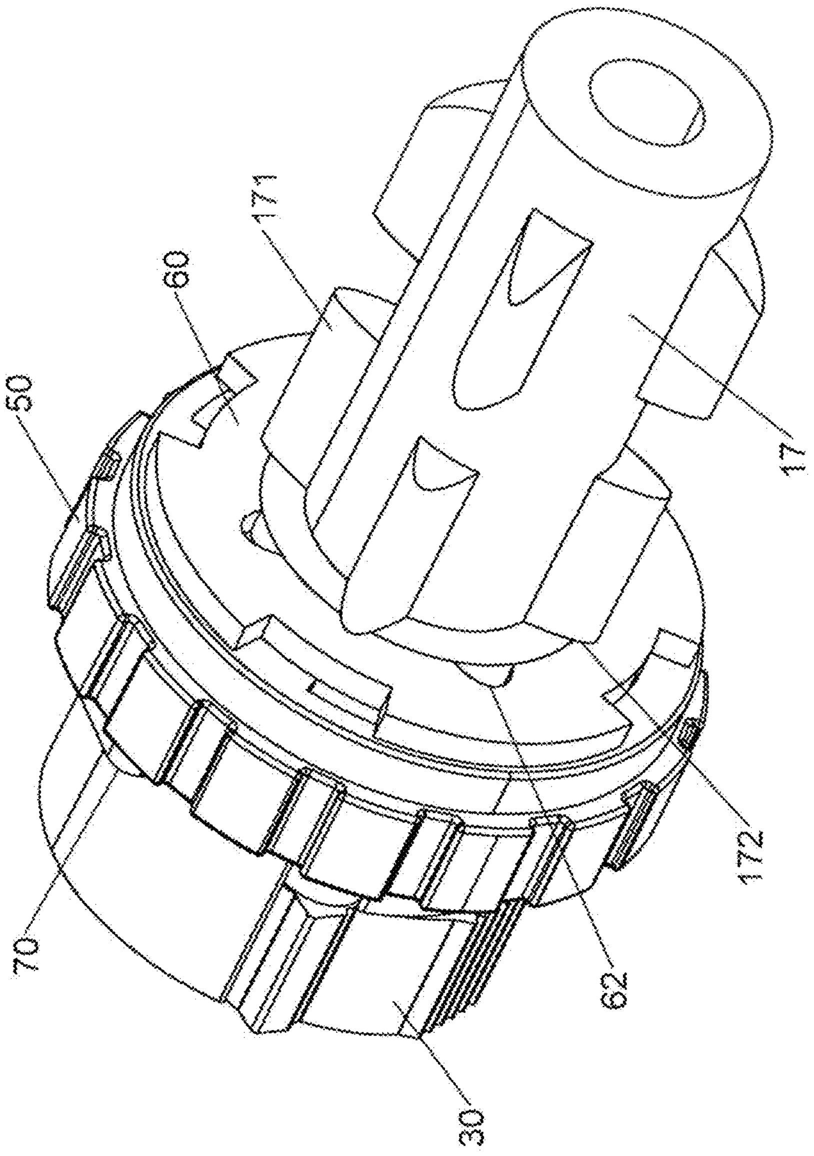
FIG. 11 is another partial perspective view of the screwdriver rotating structure in accordance with the preferred embodiment of the present invention.

Referring to FIGS. 9-11 with reference to FIGS. 1-8, the driving member 20 is removed from the main body 10. The two locking modules 30 are respectively mounted in the two first receiving grooves 11, the first pivot portion 12, and the second receiving groove 13. The first elastic element 40 is elastically biased between the abutting blocks 315 of the two locking modules 30. The control member 50 is pivotally mounted on the main body 10. The fixed plate 60 is pivotally mounted on the second pivot portion 181. Each of the two snap-fit members 70 is received in one of the two fourth receiving grooves 15. The positioning element 80 is positioned in the middle one of the three positioning grooves 51.

Figure 12:
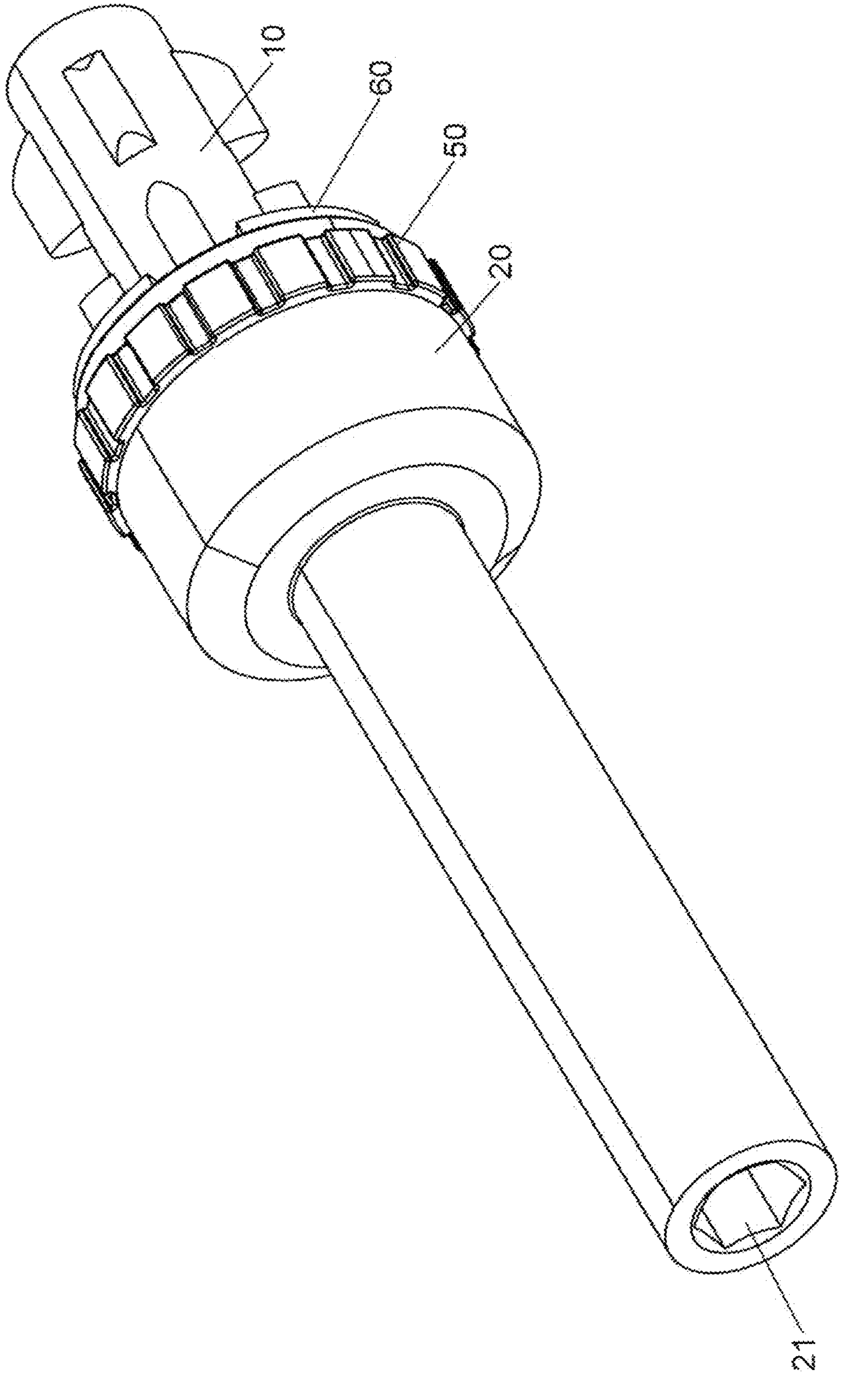
FIG. 12 is a perspective assembly view of the screwdriver rotating structure in accordance with the preferred embodiment of the present invention.

Referring to FIGS. 12-14 with reference to FIGS. 1-11, the driving member 20 is mounted on the main body 10. The snap-fit block 72 is received and locked in the annular groove 23. The control member 50 is sandwiched between the driving member 20 and the fixed plate 60. The positioning element 80 and the second elastic element 81 are received in the first spring cavity 16. The positioning element 80 is pushed by the elastic force of the second elastic element 81 and is positioned in one of the three positioning grooves 51.

Referring to FIGS. 15 and 16 with reference to FIGS. 1-14, the third abutting face 73 slightly extends into the recess 151 before assembly of the control member 50 and the fixed plate 60, so that the recess 151 allows movement of the snap-fit block 72. In such a manner, when the driving member 20 is mounted on the main body 10, the annular groove 23 slides on the two snap-fit members 70, and the snap-fit block 72 is snapped into the annular groove 23.

In another preferred embodiment of the present invention, the pawl member 31 and the locking block 32 are formed integrally, and the locking block 32 protrudes from the third pivot portion 312. Thus, the first connecting portion 314 and the second connecting portion 323 are undefined, and the pawl member 31 does not define the first control portion 313.

Accordingly, the screwdriver rotating structure of the present invention has the following advantages.

1. The driving member 20 is pivotally mounted on the main body 10 and is snapped on the two snap-fit members 70. The fixed plate 60 is pivotally mounted on the main body 10 and is sandwiched between the first abutting faces 172 of the limit blocks 171 and the second abutting face 182. The control member 50 is mounted on the main body 10 and is sandwiched between the driving member 20 and the fixed plate 60. Each of the two snap-fit members 70 is limited between one of the two fourth receiving grooves 15, the annular groove 23, the control member 50, and the fixed plate 60. Thus, the main body 10, the driving member 20, the control member 50, the fixed plate 60, and the two snap-fit members 70 are interconnected, so that the screwdriver rotating structure is assembled steadily and solidly.
2. When the driving member 20 is mounted on the main body 10, the annular groove 23 is locked by the snap-fit block 72, so that the driving member 20 is limited by the two snap-fit members 70. Thus, the driving member 20 is pivotally mounted on the main body 10.
3. Each of the two snap-fit members 70 is limited by the two first side faces 152, the second side face 153, the control member 50, and the fixed plate 60, so that the third abutting face 73 is detached from and will not fall into the recess 151, to interrupt movement of the snap-fit block 72. Thus, the driving member 20 is pivotally mounted on the main body 10 and will not be detached from the main body 10.

4. The driving member 20, the two locking modules 30, the control member 50, the fixed plate 60, and the two snap-fit members 70 are assembled on the main body 10 without detachment after the fixed plate 60 is pivotally mounted on the main body 10. Thus, the screwdriver rotating structure is conveyed elsewhere for mounting a grip so that the screwdriver rotating structure has a modularized construction and will not be dismantled during transportation.
5. The pivot hole 61 allows passage of the restriction portion 17, and the limit grooves 62 allow passage of the limit blocks 171. When the fixed plate 60 is rotated, the limit grooves 62 align with the limit blocks 171, so that the fixed plate 60 can be removed from the main body 10, or the limit grooves 62 misalign with the limit blocks 171, so that the fixed plate 60 is affixed to the main body 10. Thus, the fixed plate 60 is assembled or disassembled easily and quickly without needing any tool.
6. The locking block 32 is assembled with the pawl member 31. The locking block 32 is pivotally mounted in the second receiving groove 13. The pawl member 31 is received in one of the two first receiving grooves 11 and pivotally mounted on the first pivot portion 12. Thus, each of the two locking modules 30 has a longer length. The pawl member 31 has an engaging portion 311 meshing with the ratchet portion 22 of the driving member 20, and the locking block 32 is controlled and rotated by the control member 50, so that the pawl member 31 and the locking block 32 have different functions.
7. The pawl member 31 is provided with a first connecting portion 314, and the locking block 32 is provided with a second connecting portion 323 connected with the first connecting portion 314, so that the pawl member 31 and the locking block 32 are rotated synchronously. When the control member 50 is rotated, the third control portion 53 of one of the two receiving spaces 52 presses the second control portion 321 of one of the two locking modules 30, so that the pawl member 31 is rotated slightly, and the engaging portion 311 of one of the two locking modules 30 disengages the ratchet portion 22. Thus, the third control portion 53 and the second control portion 321 construct a control mechanism that is operated exactly.
8. The pawl member 31 is provided with an engaging portion 311 meshing with the ratchet portion 22. The engaging portion 311 has multiple engaging teeth. The first elastic element 40 is received in the third receiving groove 14 and is elastically biased between the pawl members 31 of the two locking modules 30, so that the engaging portion 311 meshes with the ratchet portion 22 exactly. Thus, the engaging portion 311 and the driving member 20 have multiple teeth engaging each other, so that the screwdriver rotating structure has an enhanced rotation torque.
9. The first elastic element 40 is a spring that is biased between the abutting blocks 315 of the two locking modules 30, so that the first elastic element 40 has a larger contact area to press the two locking modules 30 exactly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A screwdriver rotating structure comprising:

a main body, a driving member, two locking modules, a first elastic element, a control member, a fixed plate, and two snap-fit members, a positioning element, and a second elastic element;

wherein:

the main body has a first end provided with two first receiving grooves arranged symmetrically;

each of the two first receiving grooves is provided with a first pivot portion and a second receiving groove;

each of the two first receiving grooves, the first pivot portion, and the second receiving groove form an L-shaped slot;

the first pivot portion and the second receiving groove are co-axial;

the main body is provided with a third receiving groove disposed between the two first receiving grooves;

the third receiving groove connects the two first receiving grooves transversely;

the third receiving groove has an arcuate curved shape;

the main body has a peripheral face provided with two fourth receiving grooves arranged symmetrically;

the two fourth receiving grooves are arranged annularly relative to an axis of the main body;

each of the two fourth receiving grooves is provided with a recess connected to each of the two fourth receiving grooves;

each of the two fourth receiving grooves is provided with two first side faces and a second side face;

each of the two first side faces is perpendicular to the second side face;

the main body is provided with a first spring cavity formed in one of the two fourth receiving grooves;

the first spring cavity has a circular shape and does not penetrate the main body;

the first spring cavity has an axis perpendicular to that of the main body;

the first spring cavity is not connected to the recess;

the main body has a second end provided with a restriction portion having a cylindrical shape;

the restriction portion is provided with multiple limit blocks;

the limit blocks are arranged annularly and linearly on the restriction portion;

each of the limit blocks adjacent to the two fourth receiving grooves is provided with a first abutting face directed toward the two fourth receiving grooves;

the main body is provided with a receiving hole disposed on the axis of the main body;

the receiving hole penetrates the main body axially;

a second pivot portion is formed on the main body and disposed between the two fourth receiving grooves and the restriction portion;

the second pivot portion has a diameter less than that of the main body so that a second abutting face is formed on the main body and disposed between the second pivot portion and the main body;

the driving member has a first end provided with a mounting portion;

the driving member has a second end having an interior provided with a ratchet portion having multiple teeth arranged annularly;
the ratchet portion is pivotally mounted on the main body;
the ratchet portion has an opening provided with an annular groove aligning with the recess;
the two locking modules are respectively mounted in the two first receiving grooves, the first pivot portion, and the second receiving groove;
the two locking modules are arranged symmetrically relative to the main body;
each of the two locking modules includes a pawl member and a locking block;
the pawl member is received in one of the two first receiving grooves;
the pawl member has a first end provided with an engaging portion meshing with the ratchet portion;
the engaging portion has multiple engaging teeth;
the pawl member has a second end provided with a third pivot portion pivotally connected with the first pivot portion, so that the pawl member is rotated about the first pivot portion through an angle;
the third pivot portion is provided with a first control portion protruding outward;
the third pivot portion has an axis provided with a first connecting portion;
the first connecting portion is a hexagonal or noncircular hole;
the pawl member is provided with an abutting block directed toward the third receiving groove;
the locking block is received in the second receiving groove;
the locking block has a first end provided with a second control portion;
the second control portion aligns with the first control portion after the locking block is assembled with the pawl member;
the locking block has a second end provided with a second connecting portion connected with the first connecting portion, so that the pawl member and the locking block are rotated synchronously;
the second connecting portion has a shape corresponding to that of the first connecting portion;
the first elastic element is received in the third receiving groove and has two ends elastically pressing the two locking modules, so that the engaging portion constantly meshes with the ratchet portion by an elastic force of the first elastic element;
the first elastic element is biased between the abutting blocks of the two locking modules;
the control member is pivotally mounted on the main body and is rotatable relative to the main body;
the control member is rotated to control operation of the screwdriver rotating structure so that the screwdriver rotating structure is operated in a one-way direction or in a two-way direction;
the control member rests on a side of the driving member or a gap is defined between the control member and the driving member;
the control member is provided with three positioning grooves arranged annularly and spaced from each other;
one of the three positioning grooves aligns with the first spring cavity;
the control member is provided with two receiving spaces, with the three positioning grooves being located between the two receiving spaces;
the second control portion of each of the two locking modules is received in one of the two receiving spaces;
the two receiving spaces are arranged symmetrically;
each of the two receiving spaces has a side provided with a third control portion located adjacent to the three positioning grooves;
the control member is rotated to a position where the third control portion of one of the two receiving spaces presses the second control portion of one of the two locking modules, so that the engaging portion of one of the two locking modules disengages the ratchet portion;
the control member has a peripheral face provided with a rotation portion having multiple projections to facilitate rotation of the control member;
the fixed plate is assembled with the main body and is provided with a pivot hole allowing passage of the restriction portion;
the pivot hole is provided with multiple limit grooves allowing passage of the limit blocks;
the pivot hole is pivotally mounted on the second pivot portion and has a first side abutting the second abutting face;
when the fixed plate is rotated slightly after the limit grooves pass the limit blocks, the limit grooves misalign with the limit blocks, and the first abutting faces of the limit blocks rest on a second side of the fixed plate, so that the fixed plate is secured on the main body without detachment;
the control member is pivotally mounted on the main body and limited by the fixed plate, so that the control member is sandwiched between the fixed plate and the driving member without detachment;
the two snap-fit members are assembled with the main body and the driving member;
each of the two snap-fit members is received in one of the two fourth receiving grooves;
each of the two snap-fit members is provided with a second spring cavity aligning with the first spring cavity;
each of the two snap-fit members is provided with a snap-fit block pivotally mounted in the annular groove, so that the driving member is pivotally mounted on the main body by the two snap-fit members;
each of the two snap-fit members has a bottom provided with a third abutting face directed toward the recess;
each of the two snap-fit members has two sides abutting the two first side faces and has a first end abutting the second side face, so that each of the two snap-fit members is limited and non-movable in one of the two fourth receiving grooves;
each of the two snap-fit members has a second end limited by the fixed plate;
the two snap-fit members are limited by the control member so that the two snap-fit members are mounted on the main body without detachment;
the third abutting face extends into the recess before assembly of the control member and the fixed plate, so that the recess allows movement of the snap-fit block;
when the driving member is mounted on the main body, the annular groove slides on the two snap-fit members, and the snap-fit block is snapped into the annular groove;
the limit grooves align with the limit blocks;
the control member and the fixed plate are mounted on the main body serially;

the fixed plate is rotated slightly until the limit grooves misalign with the limit blocks, so that the fixed plate is secured on the main body;

the control member and the two snap-fit members are assembled on the main body by limit of the fixed plate;

each of the two snap-fit members is limited by the two first side faces, the second side face, the control member, and the fixed plate, so that the third abutting face is detached from the recess, to interrupt movement of the snap-fit block, and the driving member is pivotally mounted on the main body;

the positioning element is received in the first spring cavity and the second spring cavity;

the second elastic element is received in the first spring cavity;

the second elastic element is biased between a bottom of the first spring cavity and the positioning element, so that the positioning element protrudes from the second spring cavity slightly; and the positioning element is positioned in one of the three positioning grooves, so that the control member is positioned on the main body and drives the driving member to idle in the counterclockwise direction, to rotate in the counterclockwise and clockwise directions, and to idle in the clockwise direction.

2. The screwdriver rotating structure as claimed in claim 1, wherein a grip is mounted on the restriction portion and is operated by a user's hand to rotate the main body.

3. The screwdriver rotating structure as claimed in claim 1, wherein the mounting portion is a polygonal or noncircular hole, and the annular groove has a diameter more than that of the ratchet portion.

4. The screwdriver rotating structure as claimed in claim 1, wherein:

the fixed plate has a circular shape;

the limit grooves are arranged annularly and spaced from each other; and the limit grooves have a number equal to that of the limit blocks.

5. The screwdriver rotating structure as claimed in claim 1, wherein the positioning element is a round bead.

6. The screwdriver rotating structure as claimed in claim 1, further comprising:

a magnetic member mounted on the driving member to magnetically attract screwdriver tips of various types.

7. The screwdriver rotating structure as claimed in claim 1, wherein the pawl member and the locking block are formed integrally, and the locking block protrudes from the third pivot portion.

* * * * *